(12) United States Patent
Otsubo et al.

(10) Patent No.: US 8,087,537 B2
(45) Date of Patent: Jan. 3, 2012

(54) PRESSURE CONTAINER

(75) Inventors: Hirokazu Otsubo, Toyota (JP); Takeshi Ishikawa, Toyota (JP); Sachiko Kuroyanagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 258 days.

(21) Appl. No.: 12/311,907

(22) PCT Filed: Nov. 27, 2007

(86) PCT No.: PCT/IB2007/003651
§ 371 (c)(1),
(2), (4) Date: Apr. 17, 2009

(87) PCT Pub. No.: WO2008/072046
PCT Pub. Date: Jun. 19, 2008

(65) Prior Publication Data
US 2010/0025411 A1    Feb. 4, 2010

(30) Foreign Application Priority Data
Dec. 13, 2006    (JP) .................. 2006-336045

(51) Int. Cl.
*F17C 1/02* (2006.01)
(52) U.S. Cl. .................. 220/581; 220/592; 220/601
(58) Field of Classification Search .................. 220/592, 220/581, 582, 601, 661
See application file for complete search history.

(56) References Cited

U.S. PATENT DOCUMENTS

| 2,934,456 | A | | 4/1960 | Schutt | |
|---|---|---|---|---|---|
| 3,833,430 | A | | 9/1974 | Hill et al. | |
| 4,230,758 | A | | 10/1980 | Nagai et al. | |
| 4,867,333 | A | * | 9/1989 | Kolp et al. | 220/234 |
| 5,758,796 | A | * | 6/1998 | Nishimura et al. | 220/590 |
| 6,230,922 | B1 | * | 5/2001 | Rasche et al. | 220/586 |
| 2004/0149759 | A1 | | 8/2004 | Moser et al. | |
| 2009/0255940 | A1 | * | 10/2009 | Murate et al. | 220/592 |

FOREIGN PATENT DOCUMENTS

| GB | 494426 | 10/1938 |
|---|---|---|
| JP | A-63-019499 | 1/1988 |
| JP | A-63-023097 | 1/1988 |
| JP | A-07-310895 | 11/1995 |
| JP | A-09-176891 | 7/1997 |
| JP | A-10-267195 | 10/1998 |
| JP | A-10-332082 | 12/1998 |
| JP | A-2003-236309 | 8/2003 |
| JP | A-2004-225852 | 8/2004 |
| JP | A-2004-277866 | 10/2004 |
| JP | A-2005-048919 | 2/2005 |
| JP | A-2006-316834 | 11/2006 |
| WO | WO 02/088593 A1 | 11/2002 |

OTHER PUBLICATIONS

Anodizing, Wikipedia, Apr. 21, 2011, 9 pages.*
Lubricity, Wikipedia, Apr. 22, 2011, 2 pages.*

* cited by examiner

*Primary Examiner* — Stephen Castellano
(74) *Attorney, Agent, or Firm* — Oliff & Berridge, PLC

(57) ABSTRACT

A pressure container includes a metal socket and a CFRP layer that contacts the metal socket. A metal oxide layer is formed on a first contact area where the socket contacts the CFRP layer. The socket may be made of aluminum or aluminum alloy, and the oxide layer may be formed by anodizing the socket.

10 Claims, 4 Drawing Sheets

PRESSURE CONTAINER

BACKGROUND OF THE INVENTION

1. Field of the Invention

The invention relates to a pressure container that is provided in, for example, a fuel cell system, and more specifically, to a pressure container in which a metal socket contacts a CFRP (Carbon Fiber Reinforced Plastics) layer.

2. Description of the Related Art

An example of the aforementioned type of the pressure container is described in Japanese Patent Application Publication No. 7-310895 (JP-A-7-310895). The pressure container described is a tank in which a liner layer made of polyethylene resin is reinforced by applying a CFRP layer to an outer surface of the liner layer. An opening of the tank is provided with a socket made of aluminum alloy.

Generally, when conductors, which have mutually different electrode potentials, contact each other under a condition, e.g. a wet condition, galvanic corrosion occurs. The galvanic corrosion may also be referred to as contact corrosion, potential difference corrosion, or stray current corrosion. If the pressure container is placed in such a wet condition, an electric cell may be formed. In the electric cell, the aluminum alloy, which forms the socket, serves as a negative terminal, and the carbon, which forms the CFRP layer, serves as a positive terminal. In this case, the socket, which has lower electric potential, may corrode.

In order to prevent the aforementioned corrosion, in the pressure container described in Japanese Patent Application Publication No. 7-310895 (JP-A-7-310895), the socket is provided with an electrical insulating layer by applying an electrical insulating resin to the socket, or attaching an electrical insulating adhesive tape on the socket.

However, the process to form the aforementioned electrical insulating layer is complicated, and moreover, it is difficult to form the electrical insulating layer of entirely uniform thickness, using the methods as described above. Therefore, there has been a demand for improvement of the forming method.

SUMMARY OF THE INVENTION

The invention provides a pressure container in which a coating or a layer to suppress corrosion of a socket can be easily produced.

A pressure container according to a first aspect of the invention includes a metal socket and a CFRP layer that contacts the socket. In the pressure container, a metal oxide layer is formed on at least a portion of a first contact area where the socket contacts the CFRP layer.

According to the aforementioned configuration, the socket indirectly contacts the CFRP layer through the oxide layer, i.e. the insulating layer, thereby suppressing corrosion of the socket. Further, because the oxide layer can be formed by surface treatment, it is possible to easily form the oxide layer of uniform thickness.

In the pressure container according to the first aspect of the invention, the socket may be made of aluminum or aluminum alloy, and the oxide layer may be formed by anodizing the socket.

According to the aforementioned configuration, the corrosion-resistant oxide layer of uniform thickness can be easily produced.

In the pressure container according to the first aspect of the invention, the first contact area is on an outer peripheral surface of the socket so that the oxide layer is formed only on the outer peripheral surface of the socket.

Generally, an internal thread is provided on the inner peripheral surface of the socket such that a valve or the like is screw-inserted into and connected to the internal thread. Further, a sealing surface or seal groove is provided on the inner peripheral surface of the socket so as to seal a space between the valve or the like and the socket by providing a seal member on the sealing surface or in the seal groove. Therefore, the dimension, or the form, of the inner peripheral surface of the socket is often strictly controlled. According to the aforementioned invention, the oxide layer is formed only on the outer peripheral surface of the socket, thereby making it possible to avoid a change in the dimension or the form of the inner peripheral surface of the socket. In this way, the dimension or the form of the inner peripheral surface of the socket can be easily controlled.

When the pressure container includes the liner layer coated with the CFRP layer (i.e., the liner layer formed on an inner peripheral surface of the CFRP layer and an outer peripheral surface of the socket), a space between the outer peripheral surface of the socket and the liner layer may be sealed. In this case, the dimension or the form of the seal portion, which is used for providing sealing and which is provided on the outer peripheral surface of the socket, is strictly controlled.

The pressure container according to the first aspect of the invention may further include a liner layer and a seal portion. The liner layer may be formed on an inner peripheral surface of the CFRP layer and an outer peripheral surface of the socket. The seal portion may be formed on the outer peripheral surface of the socket, and provided with a seal member to seal a space between the socket and the liner layer. Further, in the pressure container, the first contact area may be on the outer peripheral surface of the socket, and the oxide layer may be formed at a portion of the outer peripheral surface of the socket other than the seal portion, the portion of the outer peripheral surface including at least the first contact area.

According to the aforementioned configuration, because the oxide layer is not formed on the seal portion of the socket, it is easier to control the dimension or the form of the seal portion. Also, the oxide layer can be easily formed in the portion of the outer peripheral surface of the socket that includes the first contact area where it is preferable to form the oxide layer.

The pressure container according to the first aspect of the invention may further include a liner layer formed on an inner peripheral surface of the CFRP layer and an outer peripheral surface of the socket; and a second contact area where the socket contacts the liner layer. The pressure container may be configured such that the first and second contact areas are on the outer peripheral surface of the socket, and the oxide layer is formed on the first and second contact areas so that the oxide layer is formed only on the outer peripheral surface of the socket.

Further, in the pressure container according to the first aspect of the invention, a surface of the oxide layer may be sealed by sealing treatment.

Further, in the pressure container according to the first aspect of the invention, the oxide layer may be formed on a portion of the outer peripheral surface of the socket, which is exposed to an outside of the pressure container.

Further, in the pressure container according to the first aspect of the invention, the oxide layer may have lubricity.

The oxide layer may have lubricity depending on the type of the oxide layer produced. If the oxide layer has lubricity, it is possible to avoid adhesion between the CFRP layer and the socket. Accordingly, it is possible to avoid stress concentration caused when the CFRP layer is restricted from moving.

Further, a pressure container according to a second aspect of the invention includes a metal socket and a metal liner layer that contacts the socket. In the pressure container, a metal oxide layer is formed on at least a portion of a contact area where the socket contacts the liner layer.

According to the aforementioned configuration, the socket indirectly contacts the liner layer through the oxide layer, i.e. the insulating layer, thereby suppressing corrosion of the socket. Further, it is possible to easily form the oxide layer of uniform thickness by surface treatment.

According to the pressure container of the invention, it is possible to easily form a coating or a layer to suppress corrosion of the socket.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

A pressure container according to an embodiment of the invention will be described with reference to the accompanying drawings. In the present specification, a high-pressure tank will be described as an example of the pressure container.

Figure 1:
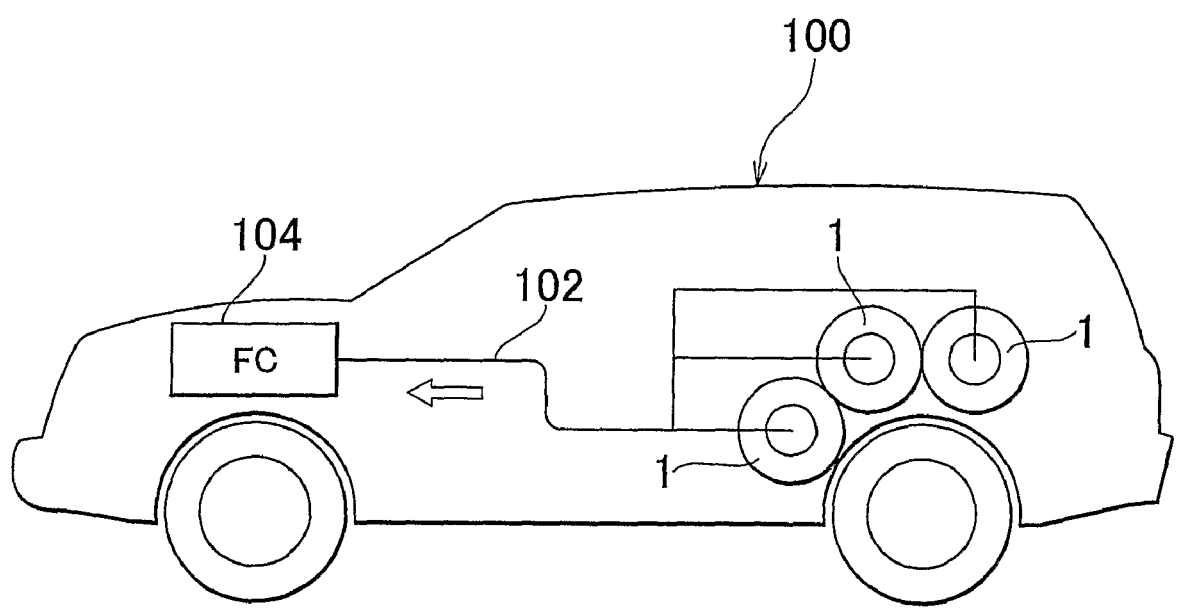
FIG. 1 is a diagram showing a fuel cell vehicle in which a pressure container according to an embodiment of the invention is provided.

FIG. 1 shows a fuel cell vehicle in which a high-pressure tank according to the invention is provided. A fuel cell vehicle 100 includes, for example, three high-pressure tanks 1 at a rear portion of a vehicle body. The high-pressure tanks 1 constitute a portion of a fuel cell system, such that fuel gas is supplied from the high-pressure tanks 1 to a fuel cell 104 through a gas supply line 102. The fuel gas stored in the high-pressure tanks 1 is flammable high-pressure gas, such as compressed natural gas or hydrogen gas. It should be noted that the high-pressure tanks 1 may be applied to other types of vehicles, e.g. an electric vehicle and a hybrid vehicle, various types of movable bodies, e.g. a watercraft, an aircraft, and a robot, and a stationary type of fuel cell, in addition to the fuel cell vehicle.

Figure 2:
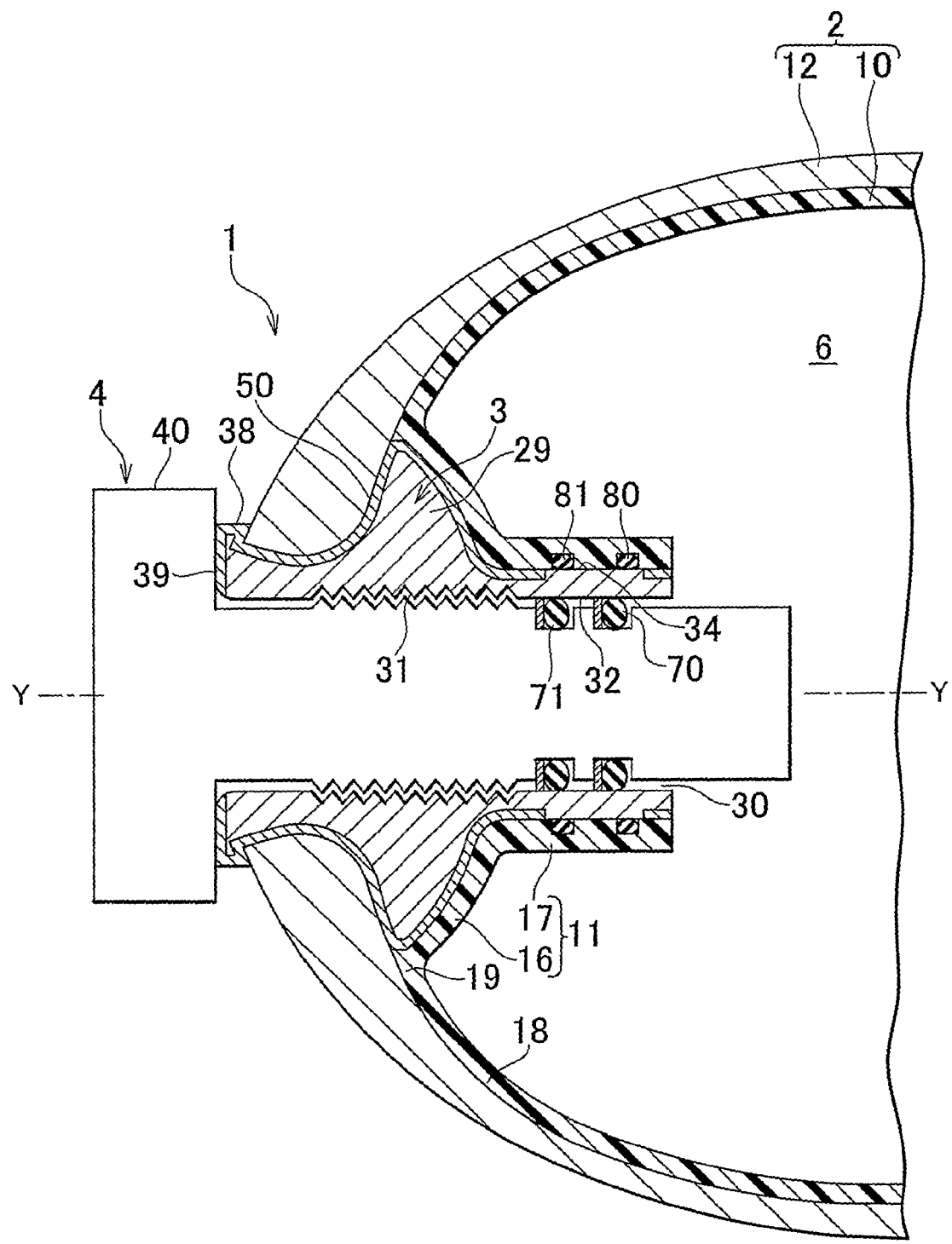
FIG. 2 is a sectional view showing the pressure container according to the embodiment of the invention.

FIG. 2 is a sectional view showing a main portion of each of the high-pressure tanks 1. The high-pressure tank 1 includes a tank body 2 and a socket 3, and a valve assembly 4 is screw-inserted into, and connected to the socket 3. The entire tank body 2 is in a cylindrical shape and tightly closed, and the space therein serves as a storage space 6 that is used for storing fuel gas at a higher pressure than the normal pressure. For example, hydrogen gas at 35 MPa or 70 MPa, or compressed natural gas at 20 MPa is stored in the storage space 6. In the description below, hydrogen gas is used as an example of the high-pressure gas stored in the high-pressure tanks 1.

The tank body 2 has, for example, a double-layer structure. One layer is a resin liner 10 with gas barrier properties. The other layer is a CFRP layer 12 disposed on an outer peripheral surface of the resin liner 10, and the resin liner 10 is disposed inside the CFRP layer 12.

The resin liner 10 may be referred to as an "inner shell" or an "inner container" of the high-pressure tank 1. The material used for forming the resin liner 10 is not particularly specified, and the resin liner 10 may be made of, for example, a hard resin such as a polyethylene resin or a polypropylene resin. Further, the resin liner 10 may also be a stacked structure including multiple layers, which is formed by combining two or more types of the aforementioned resin layers.

The resin liner 10 includes a folded portion 11. The folded portion 11 is formed on an end portion or each of both end portions in a longitudinal direction of the tank body 2, and is formed by folding the edge of the resin liner 10 toward the inward of the tank body 2 such that the edge is set apart from the CFRP layer 12. The folded portion 11 includes a curved portion 16 and a cylindrical, portion 17, which are continuous with each other. The curved portion 16 is continuous with a cylindrical body 18 through a fold point portion 19. The cylindrical body 18 is cylindrically shaped, and constitutes a major portion of the resin liner 10.

The CFRP layer 12 (i.e. fiber reinforcement layer) may alternatively be referred to as an "outer shell" or an "outer container" of the high-pressure tank 1. The CFRP layer 12 is a FRP (Fiber Reinforced Plastics) layer that is formed by reinforcing a matrix resin (plastic) with a carbon fiber. For example, an epoxy resin, a modified epoxy resin, or an unsaturated polyester resin, may be used as the matrix resin. In the embodiment, a thermosetting epoxy resin is employed as the matrix resin. Further, the fiber reinforcement layer may be formed using a metal fiber, in place of a carbon fiber, as the reinforcement fiber.

The CFRP layer 12 covers the outer surface of the resin liner 10. The CFRP layer 12 is made by means of, for example, the filament winding in which the carbon fiber impregnated with the epoxy resin is wound on the surface of the resin liner 10, and then the epoxy resin is thermally cured. The CFRP layer 12 has a stacked structure in which a plurality of hoop layers and helical layers are stacked, and is structured such that the helical layers partially cover a portion of the outer surface of the socket 3.

The socket 3 is made of aluminum or aluminum alloy, and manufactured in a predetermined shape by means of, for example, die casting. The socket 3 is disposed at one end, or the sockets 3 are disposed at both ends, of the tank body 2 in a longitudinal direction thereof, and the socket(s) 3 is/are attached to the corresponding edge/the respective edges of the resin liner 10 by means of, for example, insert molding. A collar portion 29 of the socket 3 is sandwiched between the folded portion 11 of the resin liner 10 and the CFRP layer 12.

The socket 3 includes an opening portion 30. The axis of the opening portion 30 matches an axis Y-Y of the tank body 2. The valve assembly 4, a cap, or the like is screw-inserted into and connected to the opening portion 30. For example, the valve assembly 4 is connected with the gas supply line 102 disposed outside the high-pressure tank 1, such that the hydrogen gas is discharged from the storage space 6 and supplied into the gas supply line 102. Note that, a body 40 of the valve assembly 4 is made of metal such as stainless steel, and more preferably, aluminum or aluminum alloy, which is the same material as that forming the socket 3.

An internal thread 31, into which the valve assembly 4 is inserted, is formed on an inner peripheral surface of the socket 3. Further, a sealing surface 32, on which seal members 70, 71 are provided to seal a space between the valve assembly 4 and the socket 3, is formed on the inner peripheral surface of the socket 3. The sealing surface 32 has, for example, a predetermined inner diameter, and is continuous with the internal thread 31 through an annular taper surface whose diameter gradually decreases toward the inward of the tank body 12.

The socket 3 has an oxide layer 50 that is formed by performing surface treatment on a portion of the outer peripheral surface of the socket 3. With the oxide layer 50 formed, the base material of the socket 3 does not directly contact the CFRC layer 12, thereby insulating between the socket 3 and the CFRP layer 12.

For example, anodizing (which may be referred to as an "alumite treatment"), chemical conversion treatment, or plating, etc. may be employed as a method of surface treatment. In the embodiment, anodizing method is employed as the method of surface treatment, because anodizing is beneficial in forming a uniform and thick layer and providing corrosion resistance, among all the surface treatment methods listed above. Sulfuric acid anodizing, oxalic acid anodizing, or chromic acid anodizing may be employed as the anodizing method, but anodizing method is not specifically limited to the methods listed herein. In the embodiment, the sulfuric acid anodizing is employed.

Figure 3:
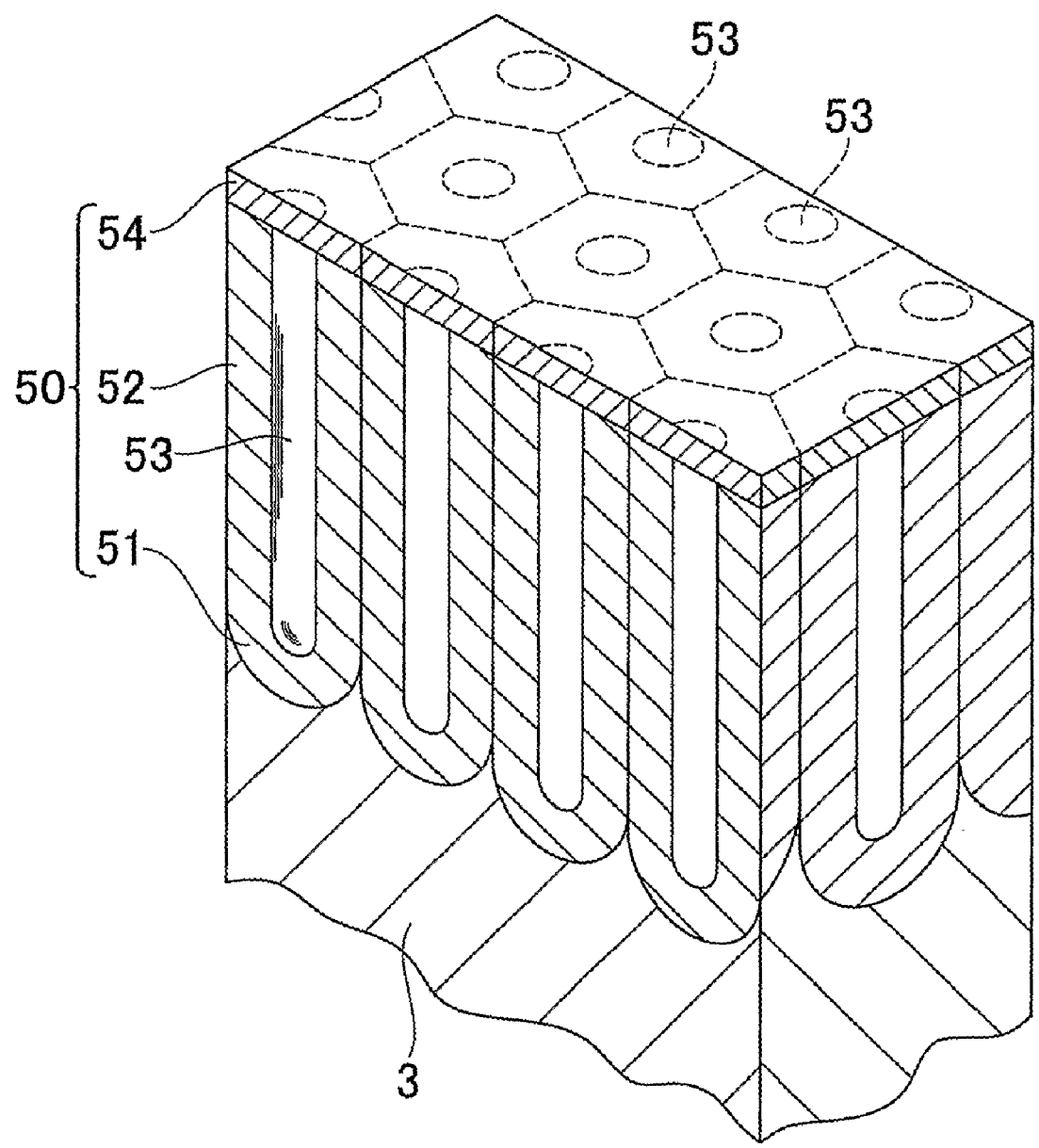
FIG. 3 is an enlarged sectional view showing an oxide layer according to the embodiment of the invention.

FIG. 3 is a sectional view showing the structure of the oxide layer 50. The oxide layer 50 is the layer of aluminum oxide produced by fusing the surface of the base material of the socket 3 made of the aluminum or aluminum alloy, that is, fusing the outer peripheral surface of the socket 3. The oxide layer 50 includes a barrier layer 51 and a porous layer 52.

The barrier layer 51 is formed on an interface between the base material and the oxide layer 50 of the socket 3 as a part of the oxide layer 50. The porous layer 52 is formed by a group of cells. Each cell is in a shape of hexagonal column, and includes a minute pore 53 at the center thereof. The porous layer 52 is continuous with the barrier layer 51. A surface 54 of the porous layer 52 is sealed by sealing treatment so that the pores 53 are covered and sealed. In this way, the wear resistance and insulation performance of the oxide layer 50 are improved. In particular, lubricity of the oxide layer 50 can be improved if the surface 54 of the porous layer 52 is sealed by the sealing treatment in which minute PTFE (polytetrafluoroethylene) particles are chemically adsorbed on the surface 54 of the porous layer 52.

The oxide layer 50 has good thickness uniformity. The thickness of the oxide layer 50 is determined based on the condition under which electrolysis is performed and the time period during which the electrolysis is performed. For example, the thickness is in a range of 3 to 30 μm. Therefore, compared to the plating method, it is easier to control the thickness when using the anodizing method. However, it is known that it is more difficult to control the dimensional accuracy compared to the plating method, because anodizing treatment reduces the thickness of the socket 3 due to the anodized layer produced on the outer peripheral surface of the socket 3. In the embodiment, in consideration of controlling the dimensional accuracy of the socket 3, the portions at which the oxide layer 50 is formed are limited as described below.

Figure 4:
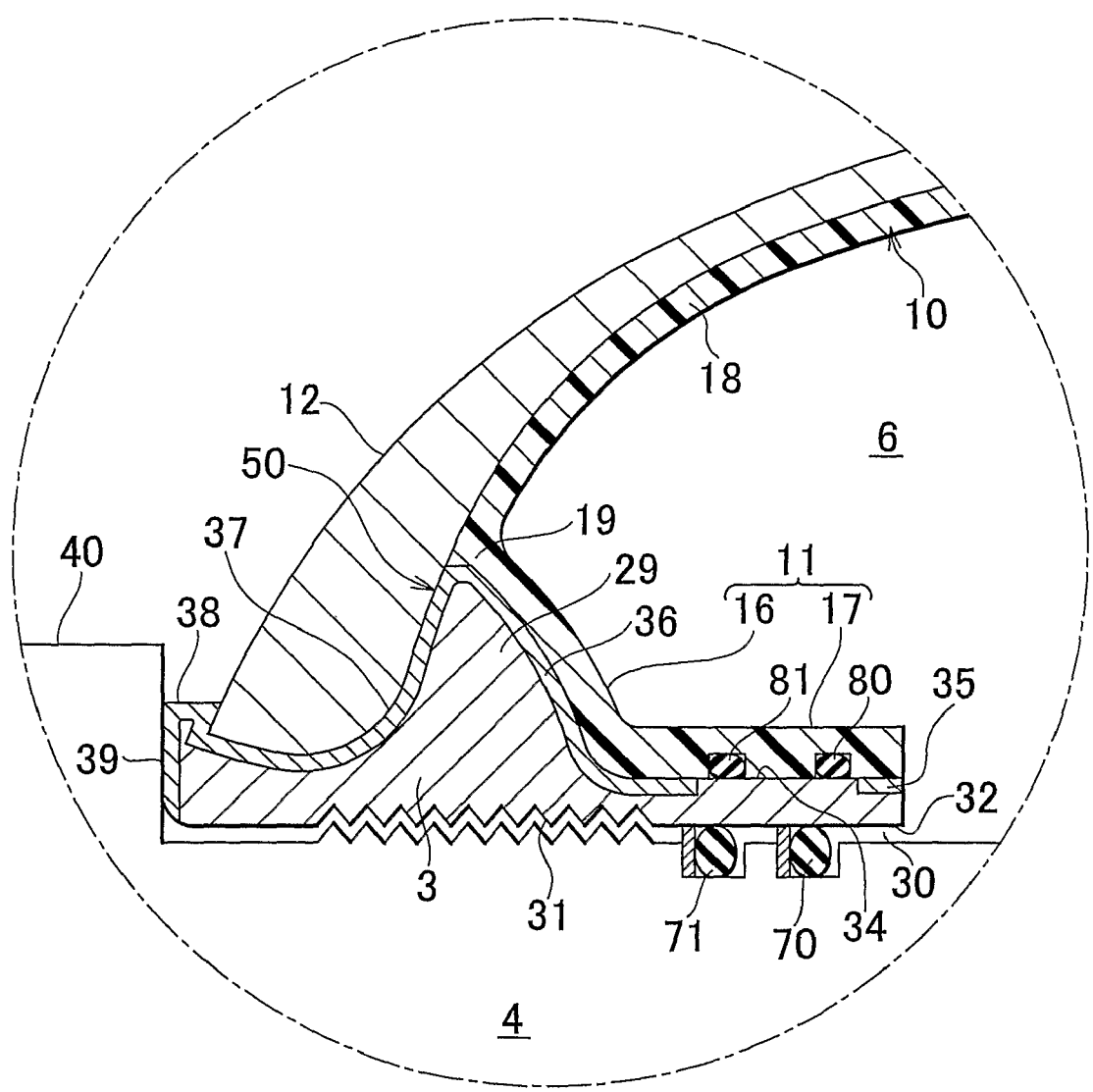
FIG. 4 is an enlarged sectional view showing a main portion of FIG. 2.

As shown in FIG. 4, the oxide layer 50 is formed only on the outer peripheral surface of the socket 3. This is because the dimensions or the forms of the internal thread 31 and the sealing surface 32 are prevented from changing even when anodizing the socket 3. In particular, if the dimension or the form of the internal thread 31 is changed, the valve assembly 4 may not be tightly screw-inserted in an appropriate manner.

Further, the hydrogen gas at high pressure is sealed by the seal members provided on the sealing surface 32. Therefore, the clearance between the sealing surface 32 and the body 40 of the valve assembly 4 should be strictly controlled, and it is not preferable that the thickness of the socket 3 at the portion where the sealing surface 32 is formed be reduced. Accordingly, by forming the oxide layer 50 only on the outer peripheral surface of the socket 3, it is made easier to control the dimension or the form of the inner peripheral surface of the socket 3.

On the other hand, the oxide layer 50 may be formed on the outer peripheral surface of the socket 3 except for the portion where the sealing surface 34 (seal portion) is formed, instead of forming the oxide layer 50 on the entire outer peripheral surface of the socket 3. That is, the oxide layer 50 is formed on a first contact area 35, a second contact area 36, a third contact area 37, and a flange surface 38, in the entire outer peripheral surface of the socket 3. This makes it easier to control the dimension or the form of the outer peripheral surface of the socket 3 in consideration of the requirement for accurate control of the clearance as described above.

The sealing surface 34 is the area used for axially sealing a space between the resin liner 10 and the socket 3 using seal members 80, 81, which are fitted into grooves formed on the inner surface of the cylindrical portion 17 of the resin liner 10. More specifically, the sealing surface 34 is the cylindrical area that extends in the direction of the axis Y-Y. The seal members 80, 81 are provided on the sealing surface 34.

The first contact area 35 and the second contact area 36 are opposed to a peripheral surface of the folded portion 11, and directly contact the peripheral surface of the folded portion 11 if the oxide layer 50 is not provided. The sealing surface 34 is disposed between the first contact area 35 and the second contact area 36. The third contact area 37 is opposed to an inner peripheral surface of the CFRP layer 12, and directly contacts the inner peripheral surface of the CFRP layer 12 if the oxide layer 50 is not provided. The second contact area 36 constitutes a half of an outer peripheral surface of the collar portion 29, and the third contact area 37 constitutes another half of the outer peripheral surface of the collar portion 29. It should be noted that the first contact area 35 and the second contact area 36 described in the embodiment may be collectively regarded as the "second contact area" or the "contact area" according to the invention, and the third contact area 37 described in the embodiment may be regarded as the "first contact area" according to the invention.

The flange surface 38 is the surface that is exposed to the outside of the high-pressure tank 1, that is, the surface that may be exposed to the outside air. A supporting surface 39 is continuous with the flange surface 38 in a substantially perpendicular manner, and is one end surface of the socket 3 in the direction of the axis Y-Y of the tank body 12. The valve assembly 4 is fitted on the supporting surface 39. In the embodiment, the oxide layer 50 is also formed on the supporting surface 39. The oxide layer 50 may not be formed on the flange surface 38 or the supporting surface 39. Further, the sealing surface 34 may be omitted, and the oxide layer 50 may be formed on the entire outer peripheral surface of the socket 3.

Next, an example of the process steps to manufacture the high-pressure tank 1 according to the embodiment will be described. First, the socket 3 is fabricated. Then, the area of the socket 3 that does not need to be anodized (e.g. the inner peripheral surface and the sealing surface) is covered by masking, and then the socket 3 is anodized. In this way, the oxide layer 50 is formed on the surfaces of the socket 3, on which the oxide layer 50 needs to be formed. The processed socket 3 is attached to the resin liner 10 by means of the insert molding. Next, the carbon fiber impregnated with the epoxy resin is wound on the outer peripheral surfaces of the socket 3 and the resin liner 10, so that the carbon fiber covers the outer peripheral surfaces, and then the epoxy resin is thermally cured. In this way, the CFRP layer 12 is formed. The high-pressure tank 1 in which the socket 3 and the tank body 2 are integrally formed is manufactured according to a series of the process steps described herein.

In the high-pressure tank 1 described in the embodiment above, the oxide layer 50 (insulating layer) is formed on the entire area where the socket 3 contacts the CFRP layer 12, thereby avoiding the direct contact between the socket 3 and the CFRP layer 12. Accordingly, galvanic corrosion of the socket 3 can be avoided. Moreover, because the oxide layer 50 is formed by anodizing, the oxide layer 50 of uniform thickness can be easily produced. Further, this makes it possible to produce the heat-resistant oxide layer 50 that is durable against heating when manufacturing the high-pressure tank 1, that is, when performing thermal curing to form the CFRP layer 12.

Further, if the oxide layer 50 has lubricity, adhesion between the CFRP layer 12 and the socket 3 can be appropriately avoided. This makes it possible to avoid restriction of the movement of the CFRP layer 12, for example, the movement of the CFRP layer 12 due to the changes of the inner pressure of the high-pressure tank 1. Therefore, the concentration of stress on the interface between the CFRP layer 12 and the socket 3 can be avoided. In addition, if the oxide layer 50 has lubricity, the adverse effects, for example, degradation of performance due to impurities that may be the concern when using the lubricant, and adverse changes over time, can be reduced.

In another embodiment, a metal liner made of, for example, aluminum may be employed as the liner layer, in place of the resin liner 10. In this case, the oxide layer 50 may be formed on the entire area where the socket 3 contacts the metal liner, in the same manner as described above. In particular, it is preferable that the oxide layer 50 be formed by anodizing the entire outer peripheral surface of the socket 3 without providing the sealing surface 34.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A pressure container comprising:
   a metal socket;
   a metal liner layer that contacts the socket; and
   a metal oxide layer that is formed on at least a portion of a contact area where the socket contacts the liner layer;
   wherein the contact area is on an outer peripheral surface of the socket so that the oxide layer is formed only on the outer peripheral surface of the socket.

2. The pressure container according to claim 1, wherein some portion of the outer peripheral surface of the socket has a metal oxide coating and other part of the outer peripheral surface of the socket does not have the metal oxide coating.

3. A pressure container comprising:
   a metal socket;
   a carbon fiber reinforced plastics layer that contacts the socket; and
   a metal oxide layer that is formed on at least a portion of a first contact area where the socket contacts the carbon fiber reinforced plastics layer;
   wherein the first contact area is on an outer peripheral surface of the socket so that the oxide layer is formed only on the outer peripheral surface of the socket.

4. The pressure container according to claim 3, wherein:
   the socket is made of one of aluminum and aluminum alloy, and the oxide layer is formed by anodizing the socket.

5. The pressure container according to claim 3, further comprising:
   a liner layer formed on an inner peripheral surface of the carbon fiber reinforced plastics layer and an outer peripheral surface of the socket; and
   a seal portion that is formed on the outer peripheral surface of the socket, and that is provided with a seal member to seal a space between the socket and the liner layer, wherein;
   the first contact area is on the outer peripheral surface of the socket, and the oxide layer is formed at a portion of the outer peripheral surface of the socket other than the seal portion, the portion of the outer peripheral surface including at least the first contact area.

6. The pressure container according to claim 3, further comprising:
   a liner layer formed on an inner peripheral surface of the carbon fiber reinforced plastics layer and an outer peripheral surface of the socket; and
   a second contact area where the socket contacts the liner layer, wherein:
   the first and second contact areas are on the outer peripheral surface of the socket, and the oxide layer is formed on the first and second contact areas so that the oxide layer is formed only on the outer peripheral surface of the socket.

7. The pressure container according to claim 3, wherein:
   a surface of the oxide layer is sealed by sealing treatment.

8. The pressure container according to claim 3, wherein:
   the oxide layer is formed on a portion of the outer peripheral surface of the socket, which is exposed to an outside of the pressure container.

9. The pressure container according to claim 3, wherein:
   the oxide layer has lubricity.

10. The pressure container according to claim 3, wherein some portion of the outer peripheral surface of the socket has a metal oxide coating and other part of the outer peripheral surface of the socket does not have the metal oxide coating.

* * * * *